United States Patent [19]

Sunouchi et al.

[11] 4,096,493
[45] Jun. 20, 1978

[54] PHOTOGRAPHIC CAMERA HAVING ELECTROMAGNETIC DIAPHRAGM CONTROL

[75] Inventors: Akio Sunouchi, Tokyo; Yoshiaki Watanabe, Fujisawa; Fumio Ito, Yokohama; Yukio Mashimo, Tokyo; Nobuaki Date, Kawasaki; Tadashi Ito, Yokohama, all of Japan

[73] Assignee: Canon Kabushiki Kaisha, Tokyo, Japan

[21] Appl. No.: 731,939

[22] Filed: Oct. 13, 1976

[30] Foreign Application Priority Data

Oct. 21, 1975 Japan .................... 50/126558

[51] Int. Cl.² ............................................ G03B 7/08
[52] U.S. Cl. ............................ 354/38; 354/23 D; 354/43; 354/47; 354/232; 354/272
[58] Field of Search .................. 354/38, 40, 43, 47, 354/228, 230, 232, 270, 271, 272, 274, 23 D

[56] References Cited

U.S. PATENT DOCUMENTS

| | | | |
|---|---|---|---|
| 3,849,787 | 11/1974 | Nakagawa | 354/232 |
| 3,899,789 | 8/1975 | Taguchi et al. | 354/43 |
| 3,906,517 | 9/1975 | Nomura et al. | 354/272 |
| 3,906,533 | 9/1975 | Mita | 354/272 |

*Primary Examiner*—Russell E. Adams
*Attorney, Agent, or Firm*—Toren, McGeady and Stanger

[57] ABSTRACT

A photographic camera having a manually and automatically adjustable diaphragm is provided with an electromagnetically operated diaphragm scanning mechanism in combination with a manually operable depth of field pre-viewing device to enable a visual determination of the utilizable zone of sharpness in a reflex viewfinder of the camera regardless of the fact that the camera remains in the run down position. For this purpose, the diaphragm scanning mechanism includes a scanning member and a driving member arranged to establish driving connection therebetwen during the automatic adjustment of the diaphragm. Release means is provided and is responsive to the termination of closing operation of the camera shutter for effecting release of the driving connection, whereby the photographer before cocking the camera is enabled to manipulate the diaphragm followed by the pre-viewing device to read off the range of sharpness in dependence on the manual setting of the diaphragm for use in making a subsequent exposure.

17 Claims, 5 Drawing Figures

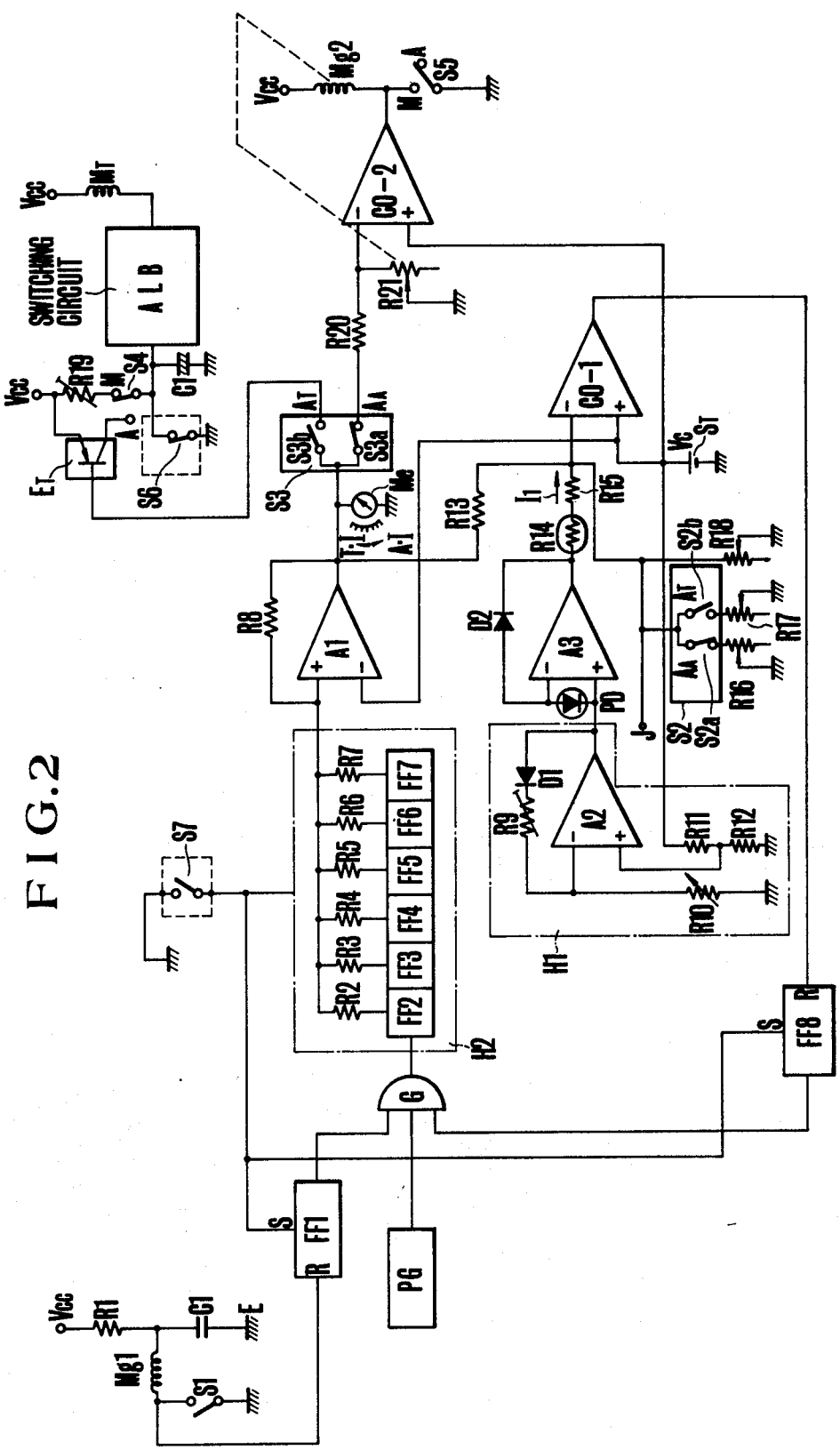
F I G. 2

PHOTOGRAPHIC CAMERA HAVING ELECTROMAGNETIC DIAPHRAGM CONTROL

BACKGROUND OF THE INVENTION

1. Field of the Invention

This invention relates to photographic cameras, and more particularly to a single lens reflex camera having an automatic diapharagm control with an electrically operating diaphragm scanning mechanism. Still more particularly, it relates to an improvement of the diaphragm scanning mechanism by the provision of a release device for permitting manipulation of the diaphragm ring while the camera remains in the run down position.

2. Description of the Prior Art

In general, single lens reflex cameras are provided with either or both of two types of automatic exposure control, one of which is to effect automatic adjustment of the diaphragm by an automatic control mechanism in accordance with a preselected shutter speed, and another type, which is to effect automatic determination of an exposure time interval by a delay circuit in accordance with a preselected diaphragm aperture value on the diaphragm presetting ring provided in the lens tube of the camera.

Most of the conventional single lens reflex cameras having shutter preselection and diaphragm preselection automatic exposure control ranges have thus far used exposure meter systems in which, with the diaphragm ring manually set in "Auto" position, the position of the deflected pointer of the exposure meter is scanned, and the scanning result is introduced into the lens aperture mechanism of the camera. In accordance with known techniques, it is possible to record a certain depth of field with this type of camera allowed to remain in the run down position.

In a known camera having an electrically operated diaphragm scanning mechanism by which the diaphragm is automatically formed, a scanning member associated with a variable resistor is driven for scanning operation with movement of the diaphragm presetting ring until the output of the variable resistor reaches a level dependent upon the output of an exposure value computing circuit upon release of the camera. The computed aperture value, thereby the scanning member is held from further movement by electromagnetically operated arresting means. With the camera employing such a new diaphragm scanning mechanism, however, it is impossible to manipulate the diaphragm ring with the camera left in the run down position since the scanning mechanism is interlocked by the stationary arresting means in the arrested position to prevent the diaphragm presetting ring from moving to the initial position. Thus, the diaphragm ring can not be moved throughout the entire aperture value selecting range available when the camera is in the cocked position. After the shutter is closed the photographer must therefore operate the film winding-up or shutter cocking lever. Otherwise, it would be impossible to select a desired aperture value on the diaphragm ring for purposes of predeterminating the utilizable zone of sharpness, or of making the camera ready for a subsequent exposure in either the diaphragm preselection automatic exposure range or the manual exposure range. Since checking the range of sharpness as well as manually setting the diaphragm aperture value on the diaphragm presetting ring can only be done with the camera reset in the cocked position, this manipulation is rather complicated and very difficult for the photographer to master in such a new type of camera.

SUMMARY OF THE INVENTION

It is an object of the present invention to eliminate the above mentioned conventional drawbacks and to provide a single lens reflex camera having an electrically operating diaphragm scanning mechanism with electromagnetically operated arresting means which is capable of permitting the photographer to manipulate the diaphragm ring in order to select a desired aperture value thereon for use in making a subsequent exposure, and to check the range of sharpness in dependence on the desired setting of the diaphragm regardless of whether or not the camera is in the cocked position.

Another object of the invention is to provide an electrically operating diaphragm scanning mechanism having electromagnetically operated arresting means, in combination with a release device for releasing the interlocking connection between a scanning member and a master member associated with the arresting means at the instant the shutter of the camera is closed.

Another object of the invention is to provide a release device of the character described which not only functions to release the interlocking connection in automatic response to the running down movement of the rear shutter curtain but also serves to charge the master or main driving member for the scanning member when the shutter cocking lever is operated to reset the camera.

Another object of the invention is to enable the photographer to check the near limit and the far limit of the object field to be photographed with a camera of the type described regardless of whether or not the camera is in the cocked position.

Other objects, features and advantages of the invention will become apparent from the following detailed description of a specific embodiment of the invention taken in conjunction with the accompanying drawings in which:

BRIEF DESCRIPTION OF THE DRAWINGS

FIG. 2 is a circuit diagram, partly in block form, of a digitaled automatic exposure control apparatus having shutter preselection and diaphragm preselection exposure ranges usuable with the camera of FIG. 1.

DESCRIPTION OF THE PREFERRED EMBODIMENT

Figure 1:
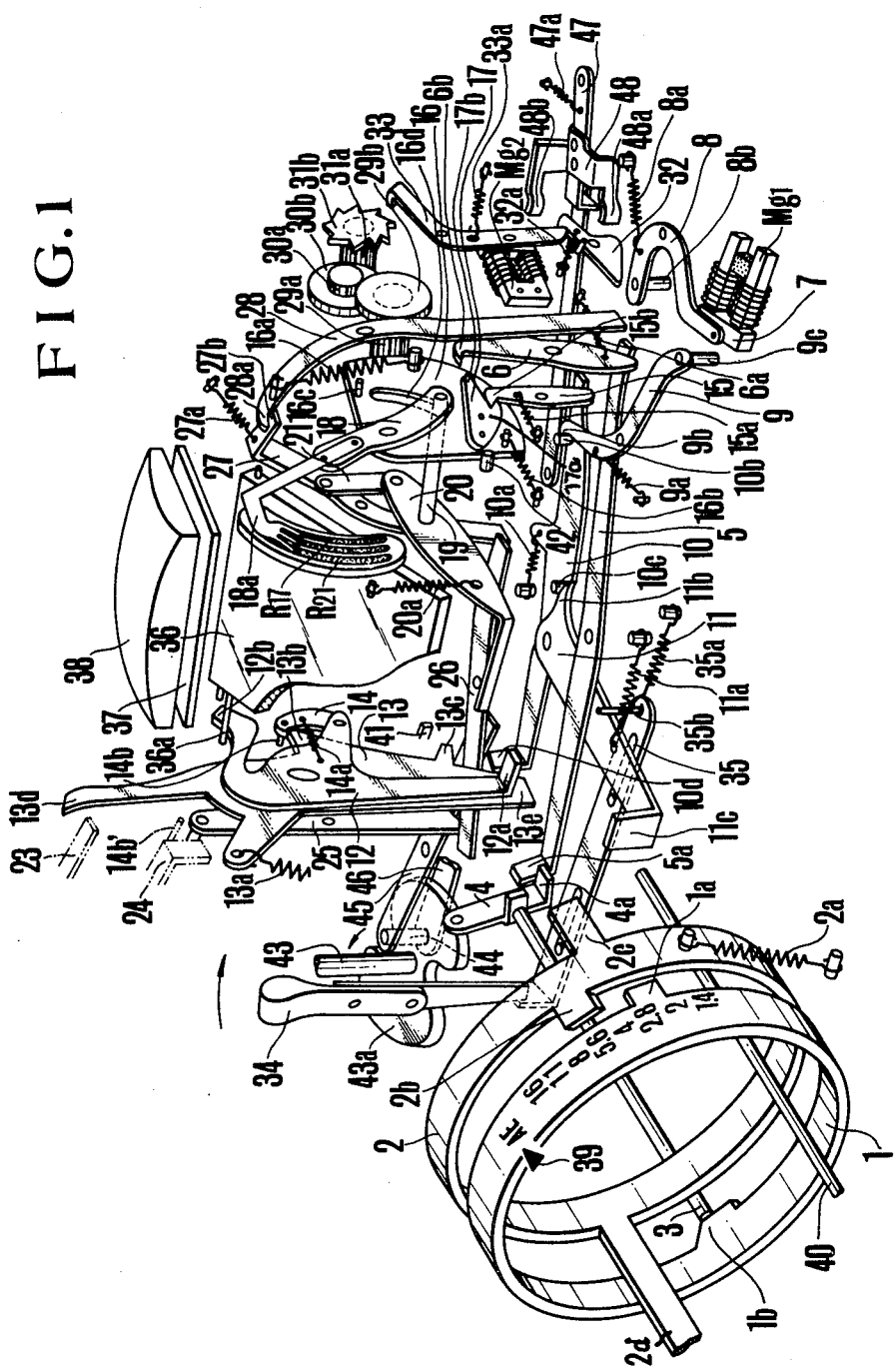
FIG. 1 is a perspective view, partly exploded, of one embodiment of the basic parts of a single lens reflex camera employing an electrically operating diaphragm scanning mechanism having electromagnetically operated arresting means in combination with a release device according to the invention.

Referring to FIG. 1, there is shown one embodiment of an electrically operating diaphragm scanning mechanism provided with a release device according to the present invention as applied to a single lens reflex camera of the type having shutter preselection and diaphragm preselection automatic exposure ranges. The camera is shown to be in the cocked position and made ready to operate in the shutter preselection exposure range. The camera comprises an individual interchangeable objective lens barrel (not shown) having mounted therein a lens aperture mechanism, and a body carrying the lens barrel at the front panel thereof and having incorporated therein the electrically operating diaphragm scanning mechanism with electromagnetically operated arresting means therefor and with the release device of the invention, an automatic diaphragm closing down and opening up mechanism, a mirror mechanism, a shutter mechanism, and a cocking and release mechanism with coordinating control means for these portions of the camera, a number of mechanical switches constituting part of the coordinating control means being omitted for the purpose of clarity, each of which will now be described below.

The lens aperture mechanism includes a manually operable diaphragm preselecting ring or diaphragm ring 1 having cut thereon a symbol "AE" representing the shutter preselection automatic diaphragm exposure control mode and a diaphragm scale with graduations, namely, 16, 11, . . . . , 1.4, each of which can be brought into registry with a stationary index 39 provided on the lens barrel and having a stop lug 1a and a cam lobe 1b, and automatically operable diaphragm presetting ring 2 which is biased by a spring 2a in a clockwise direction, as viewed in the figure, and which has a lug 2b arranged to be always maintained for abutment against the stop lug 1a, except for the time interval between the camera release and the shutter closure when the diaphragm is automatically formed, as the release device of the invention is provided, whereby it is possible to manipulate the diaphragm ring 1 regardless of whether or not the camera is in the cocked position. The diaphragm presetting ring 2 is provided with first and second arms 2c and 2d which extend parallel to the optical axis of the lens rearwardly and forwardly respectively. The position of the second arm 2c is scanned by a not shown bell crank member through a not shown cam ring, which in turn determines the amount of movement of a not shown drive ring member for the diaphragm blade assembly, thereby the scanning result which will be described later is translated into the proper diaphragm aperture value when the diaphragm closing down mechanism is operated.

In order to switch the camera between the two operating ranges in automatic response to the setting of the diaphragm ring 1 at symbol "AE" into or out of registry with the index 39, there is provided an exposure range changeover mechanism comprising a pin 3 situated in the lens barrel and arranged at one end thereof to serve as a cam follower pin for the cam lobe 1b, the opposite end of which abuts against an ear of a lever 4, and an intermediate lever 5 positioned between the lever 4 and a first latch lever 6 of the diaphragm scanning mechanism so that the bent-over lug 4a of the lever 4 is always maintained in abutting engagement with the bent-over lug 5a of the intermediate lever 5 as the first latch lever 6 is biased by a spring 6a in a counter-clockwise direction, the parts 4 and 5 being situated in the camera body. When the diaphragm ring 1 is turned to place "AE" out of registry with index 39, the pin 3 is moved away from the cam lobe 1b so that the diaphragm scanning mechanism is maintained inoperative by the first latch lever pawl 6b-and-one tooth 17b of two-toothed member 17 engagement when the camera is released to disengage a second latch lever 15 of the scanning mechanism at its pawl 15b from the other tooth 17a against the force of a spring 15a.

The diaphragm scanning mechanism further includes a master or main driving member in the form of a toothed segment 16 on which the two-toothed member 17 is fixedly mounted, a scanning member 18 pivotal about a common shaft of the segment 16 independently of the latter and having two parallel fingers with respective variable resistor slider brushes 18a fixedly mounted at the angled-off end thereof and arranged to slidingly move on respective arcuate resistance tracks R17 and R21 concentric with each other to the axis of the scanning member shaft, the opposite end of which has a pin 19 extending in eccentrically parallel relation to the scanning member shaft through an arcuate slot 16d provided through the plate of the segment 16 in concentricity to the shaft for permitting rotative movement of the scanning member 18 relative to the segment 16, and a transmission which functions to convert ever-varying angular positions of the diaphragm presetting ring 2 into corresponding amounts of displacement of the slider 18a of the variable resistors R17 and R21. This transmission comprises a linkage lever 21 movably mounted at one end thereof on the camera housing not shown, and a swing lever 20 pivoted on the free end of the linkage lever 21 and connected at the center to the pin 19. The swing lever 20 has a rectangularly deflected section at the free end thereof and is biased by a spring 20a which is weaker than the spring 2a to urge the deflected section for normally abutting engagement with the end portion of the first arm 2c of the diaphragm presetting ring 2.

The release device of the invention comprises a drive charge lever 28 pivotal in a plane slightly deviated from that of the toothed segment 16 between two terminal positions, namely, an active position where a helical spring 16a connected between the charge lever 28 and the segment 16 is sufficiently tensioned so that the segment 16 is caused to function as the master or main driving member for the scanning mechanism, and an idle position where the charge lever 28 is disengaged at its pawl 28a from the bent-over lug 27b of a latch lever 27, moving counter-clockwise toward a stop pin 16c extending from the segment 16, so that the driving spring 16a is relaxed to permit clockwise movement of the segment 16 until it abuts a stop pin 42 under the action of a spring 16b, a release lever 26 cooperative with the latch lever 27, and an actuating lever 25 having mounted at one end thereof a pin extending into the path of movement of an output member 24 of the rear shutter curtain BS (see FIG. 5) so that when the rear shutter curtain BS runs down to terminate an exposure, the actuating lever 25 is turned in a clockwise direction, causing counter-clockwise movement of the release lever 26 which in turn causes counter-clockwise movement of the latch lever 27 against the force of spring 27a, whereby the scanning member 18 with its transmission 19, 20 and 21 is released from operative connection with the master or main driving member 16 and therefore from the interlocking connection with the electromagnetically operated arresting means as the toothed portion of segment 16 meshes with a pinion 29a constituting part of the arresting means. It is now to be noted that the arcuate slot 16d is so dimensioned that the scanning member 18 is movable over the entire possible range of movement relative to the segment 16 latched by the second latch lever 15 and that when the scanning mechanism is set in the initial position to couple with the lens aperture mechanism of any one of the available interchangeable objective lenses of different F-number, there is a respective substantial air space between the pin 19 and the adjacent end of the slot 16d in order to insure that the segment 16 can be latched by either or both of the first and second latch levers 6 and 15.

The arresting means further includes a gear 29b coaxial with the gear 29a and meshing with a pinion 30a, a gear 30b coaxial with the pinion 30a and meshing with a pinion 31a, and a stop wheel 31b. Each of the teeth of the stop wheel are configured so that when the solenoid of an electromagnet Mg2 is deenergized to permit counter-clockwise movement of an arresting lever 33 under the action of spring 33a, the bent-over lug of the arresting lever 33 is brought into engagement with one of the stop wheel teeth, thereby the reduction gear train 29, 30, 31 is stopped from further movement, but when the drive charge lever 28 is released to the idle position, the segment 16 can be turned clockwise under the action of spring 16b, as the stop wheel 31b is turned in the opposite direction to that occurring when the scanning operation proceeds in spite of the fact that the arresting lever 33 remains engaged with the stop wheel 31b. The arresting lever 33 is provided with a latch lever 32 positioned at its pawl 32a adjacent the tail of the arresting lever 33 so that when the cocking mechanism is operated, the arresting lever 33 is disengaged from the stop wheel 31b and then latched by the latch lever 32 in position adjacent the electromagnet Mg2.

The diaphragm closing down and opening up mechanism comprises an operating pin 40 situated in the lens barrel and extending from the aforesaid diaphragm blade drive ring rearwardly in parallel to the optical axis of the objective lens into the path of movement of a bent-over lug 11c of a control lever 11. This control lever 11 is pivotally mounted on a common shaft of an automatic diaphragm drive motion transmitting lever 10 which serves also as a release member for the second latch lever 15 of the scanning mechanism and which has a pin 11c fixedly mounted thereon and arranged to establish a motion transmitting connection with the control lever 11 at its projection 11b when the lever 10 is released from a latch lever 9 therefor. When the lever 10 is in the cocked position, the control lever 11 is allowed to assume a position where the bent-over lug 11c is not acted on by the operating pin 40 so that the lens aperture mechanism forms a maximum possible diaphragm aperture as the control lever 11 is biased by a spring 11a in a counter-clockwise direction. To enable manual closing down and opening up of the diaphragm, there is provided a pre-viewing device comprising an operating lever 34 accessible from the outside of the camera and a slide member 35 which is biased by a spring 35a to urge a bent-over lug of the slide 35 into normal abutting engagement with the end portion of a downwardly extending arm of the operating lever 34. Slide member 35 has a pin 35b fixedly mounted thereon and extending into the path of movement of the control level 11 so that when the level 34 is manually operated to move in a clockwise direction as indicated by the arrow, the slide 35 is moved to the left and is in driving engagement through the pin 35b with the control lever 11. The acutal size of diaphragm aperture is thereby adjusted to a setting made on the diaphragm ring 1 to permit checking the range of sharpness, for example.

A view-finder of the camera includes a mirror 36 pivotally mounted on a pair of stub shafts extending from the either side of the mirror support member and positioned between the objective lens and the two-curtain type focal plane shutter. The mirror 36, in its viewing position as shown in FIG. 1, reflects light entering through the objective lens upwards onto a focusing screen 37 where an image of the object area to be photographed is formed with a certain depth of field independence on the setting of the diaphragm. A condenser lens 38 is positioned above the focusing screen 37.

Figure 4:
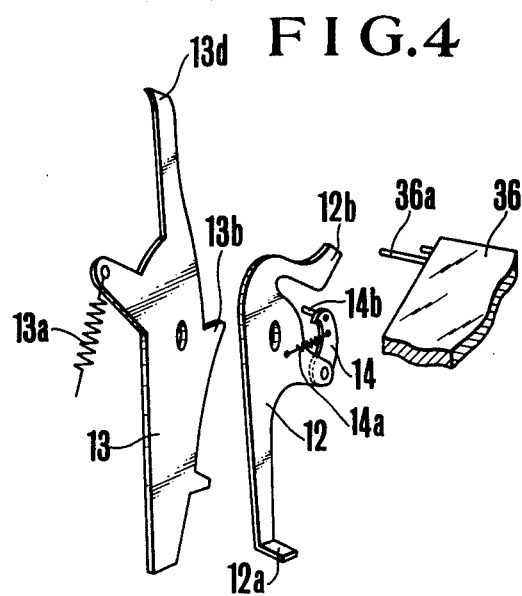
FIG. 4 is an exploded perspective view showing the details of the camera mechanism driving lever, the mirror control lever and the latching lever therefor of FIG. 1.

The reflex mirror 36 is made movable between its viewing and its non-viewing positions, since a stud 36a extending from the left side wall of the mirror mounting member near the stub shaft is supported against the higher concave edge 12b of an angled-off mirror control lever 12 pivotally mounted on a common shaft of a spring-powered driving lever 13. Positioned between the levers 12 and 13 is a mirror return control lever 14 pivotal at a pin mounted on a rearwardly extending arm of the control lever 12 in eccentrically parallel relation to the common shaft thereof, and which is biased by a spring 14a in a counter-clockwise direction to urge the return control lever 14 for driving engagement at its pin 14b with a driving tab 13b of the lever 13. The structural details of these parts 36a, 12, 13 and 14 are illustrated in FIG. 4. The pin 14b extends into the path of movement of the rear shutter curtain output member 24 at a location as shown by dash-and-dot lines 14b', when the mirror 36 is in its non-viewing position as the driving lever 13 is turned counter-clockwise from the illustrated position under the action of a driving spring 13a. Upon running down movement of the rear shutter curtain BS, the pin 14b slides off from the driving tab 13b to permit returning movement of the control lever 12. The mirror control lever 12 has a bent-over lug 12a normally abutting against the bent-over lug 10d of the automatic diaphragm closing down motion transmitting lever 10 under the action of a spring 10a. The driving lever 13 has an upwardly extending arm 13d which serves as an actuating member for a front shutter curtain latching lever 23 (see FIG. 5) as indicated by dash-and-dot lines in FIG. 1.

The release mechanism for actuating a release of those mechanisms which have been described above includes a permanent magnet-combined electromagnet Mg1, and a semi-circular lever 8 carrying at one end an armature 7 positioned adjacent the magnet Mg1, the opposite end of which is near, or in contact with a bevelled edge of the latch lever 32 for arresting lever 33 so that when the solenoid of electromagnet Mg1 is energized to cancel the magnetic flux of the permanent magnet, the lever 8 is turned clockwise under the action of a spring 8a, causing clockwise movement of the latch lever 32 which results in disengagement of the lever 32 from the arresting lever 33. Such clockwise movement of the lever 8 causes clockwise movement of the latch lever 9 through the armature 7-and-pin 9c connection against the force of spring 9a, thereupon the automatic diaphragm closing down lever 10 begins to turn clockwise under the action of the driving spring 13a.

The film winding and shutter cocking mechanism includes a shaft 43 having a film winding lever not shown mounted at the top end thereof and having a cam disk 43a coaxially fixedly mounted on the bottom end thereof, and a cam follower pin 44 connected between upper and lower levers 45 and 46 at their respective ends and maintained in normal contact with the camming surface of the cam disk 43a under the action of a not shown spring. The upper lever 45 serves to charge the spring-powered driving lever 13, while the lower lever 46 is arranged to cooperate with an additional lever 47, although shown as exploded therefrom. The lever 47 is biased by a spring 47a in a counter-clockwise direction and has a resilient member 48 fixedly mounted theron and having two arms 48a and 48b arranged so that when the cam disk 43a is turned counter-clockwise as indicated by the arrow shown adjacent thereto, the lever 47 is turned clockwise by carrying at the arm 48a the semi-circular lever 8 along in the counter-clockwise direction by engagement between the arm 48a and a pin 8b extending downwardly from the lever 8 against the force of the spring 8a, and by carrying at the arm 48b the arresting lever 33 along in the clockwise direction against the force of a spring 33a until the arresting lever 33 tail is positioned adjacent the electromagnet Mg2. This lever 47 also serves to charge the release device for the diaphragm scanning mechanism by carrying the drive charge lever 28 along in the clockwise direction from its idle position to the active position.

FIG. 2 is an example of the circuitry of an automatic exposure control system adapted for use with a camera of the type described and shown above in connection with FIGS. 1, 4 and 5. The system comprises an exposure metering circuit, a digital-to-analog converter, a shutter control circuit and a diaphragm control circuit.

The exposure metering circuit comprises a photosensitive element PD, an operational amplifier A3 having a pair of input terminals between which the photosensitive element PD is connected, a logarithmic compression diode D2 connected in the feedback network of the amplifier A3, and an adder comprising a balancing resistor R15 connected at one end to the output terminal of the amplifier A3 through a temperature compensating resistor R14, the opposite end of which is connected to an input terminal of a comparator CO1, a shutter speed setting variable resistor R16, an aperture value setting variable resistor R17, shown FIG. 1, the resistors R16 and R17 being selectively connected to the input terminal of the comparator CO1 by a switch S2, and an additional variable resistor R18 for setting the film speed, the full open aperture compensation factor and exposure correction factor and the like connected in parallel with either of the variable resistors R16 and R17.

In order to stabilize the exposure metering circuit against ambient temperature variation, and circuit element parameter deviation from specific values, there is provided a compensating circuit H1 comprising an operational amplifier A2 having an output terminal connected to the non-inversion input terminal of the amplifier A3, a temperature compensating diode D1 equivalent in characteristics to the logarithmic compression diode D2, a variable resistor R9 connected in series with the diode D1 and in the feedback network of the amplifier A2, a semi-fixed resistor R10 of which the resistance value is previously adjusted so that the current flowing through the diode D1 is equal to that flowing through the photosensitive element PD exposed to light at a reference level of luminance at which the perfect temperature compensation is to be effected, and which is connected between the inversion input terminal of the amplifier A2 and the ground, and a resistance voltage divider comprising two resistors R11 and R12 connected in series with each other between a bias voltage source Vc and the ground and having an output tap connected to the non-inversion input terminal of the amplifier A2. The resistors R11 and R12 are usually selected to have R11 << R12 so that the variation with temperature of the reference voltage Vc is followed by almost equal variation of the voltage appearing at the non-inversion input terminal of the amplifier A2, as expressed by the formula R12 × Vc/(R11 + R12).

The digital-to-analog converter comprises a binary couner H2 having six flip-flops FF2 to FF7 with their respective resistors R2 to R7 of $2^n$ resistance difference and which is cleared when a switch S7 is operated in automatic response to the cocking of the shutter. The input terminal of the binary counter H2 is connected through an AND gate G to a pulse generator PG. The other two input terminals of the AND gate G are connected to respective output terminals of flip-flops FF1 and FF8. The flip-flops FF1 and FF8 have "set" terminals S connected to the common switch S7, and has "reset" terminals R connected respectively to a start switch S1 and to the output terminal of the comparator CO1, so that when the switch S7 is operated, FF1 and FF8 are set to produce signals of high level. When the switch S1 is closed to energize the solenoid of electromagnet $Mg_1$ from a charged capacitor C1 connected through a charging resistor R1 to a voltage source Vcc, the FF1 is reset to produce a signal of low level, and when the output of the binary counter H2 after processed by a buffer amplifier A1 with its feedback resistor R8 followed by an input resistor R13 becomes coincident with the output of the exposure metering circuit, the FF8 is reset to produce a signal of low level, whereby the output of the exposure metering ciruict representing an exposure value is stored on the digital-to-analog converter H2 in the digital form.

Figure 3:
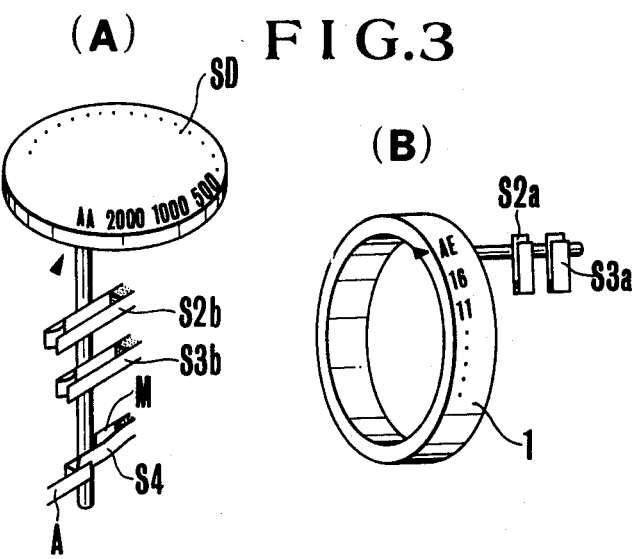
FIGS. 3A and 3B are fragmentary perspective views showing examples of arrangement of exposure range change over switches of FIG. 2 adjacent a shutter speed dial and a diaphragm ring respectively.

The output of the buffer amplifier A1 is applied to an exposure value indicator in the form of a current meter Me of which the pointer is cooperative with either of a shutter time scale TI and a diaphragm value scale AI. In order to apply the output of the buffer amplifier A1 selectively to either of the shutter and diaphragm control circuits, there is provided a switch S3 having two switch elements S3a and S3b arranged adjacent respective control pins extending from the diaphragm ring 1 and shutter dial SD, such as shown in FIG. 3, to be closed when the camera is switched in either of the shutter preselection and diaphragm preselection exposure ranges respectively.

The diaphragm control circuit comprises a comparator CO2 having two input terminals one of which is connected through a resistor R20 to a fixed contact AA of the switch element S3a and also directly to the variable resistor R21, shown in FIG. 1, of the diaphragm scanning mechanism, and the other input terminal of which is connected to the common reference voltage source ST of amplifiers A1, A2 and A3 and comparator CO1, and the solenoid of the electromagnet Mg2 of FIG. 1 connected between the output terminal of the comparator CO2 and the power supply source Vcc. Connected between the output terminal of the comparator CO2 and ground is a switch S5 arranged to be opened when the diaphragm is automatically formed, and to be closed when manual setting of the diaphragm.

At the time when the shutter release button is depressed to close the switch S1, the output voltage of the amplifier A1 is positive in respect to the reference voltage Vc, so that the solenoid Mg2 is energized to hold the arresting lever 33 at rest. As the scanning slider brush 18a scans the resistance track to vary the resistance value of the resistor R21, when the output of the resistor R21 has reached a level dependent upon the output of the buffer amplifier A1 and the reference voltage Vc, the output of the comparator CO2 is inverted to deenergize the solenoid Mg2, thereby the main driving member 16 with the reduction gear train 29 to 31 is arrested.

The shutter control circuit comprises a transistorized logarithmic extension circuit ET having an input terminal connected to the fixed contact of the switch element S3b, a timing capacitor connected to the circuit ET through an exposure range selector switch S4, a manually operable shutter speed setting variable resistor R19 connected through the switch S4 to the common timing capacitor C1 a Schmitt type trigger or switching circuit ALB selectively responsive to the first and second timing circuits, namely, a combination of ET and C1 and a combination of R19 and C1 respectively, for energizing and deenergizing the solenoid of an electromagnet MT (see FIG. 5) controlling closing operation of the shutter, and a switch S6 connected across the timing capacitor C1 to be opened when the front shutter curtain runs down to the aperture open position. actuable FIG. 3A shows an example of arrangement of the switch elements S2b and S3b and the circuit transfer switch S4 of FIG. 2 as actuable by a single operating pin extending downwardly from the shutter speed setting dial SD. When the symbol "AA" on the shutter dial SD is placed in registry with a stationary index, the switch elements S2b and S3b are closed, and the switch S4 is set in "A" position, while when the symbol "AA" is placed out of registry with the index, the switch elements S2b and S3b are opened, and the switch S4 is set in "M" position. FIG. 3B shows an example of arrangement of the switch elements S2a and S3a as Actuable by a single operating pin connected to the diaphragm ring 1. When the symbol "AE" on the diaphragm ring 1 is placed in registry with the index, the switch elements S2a and S3a are closed.

Figure 5:
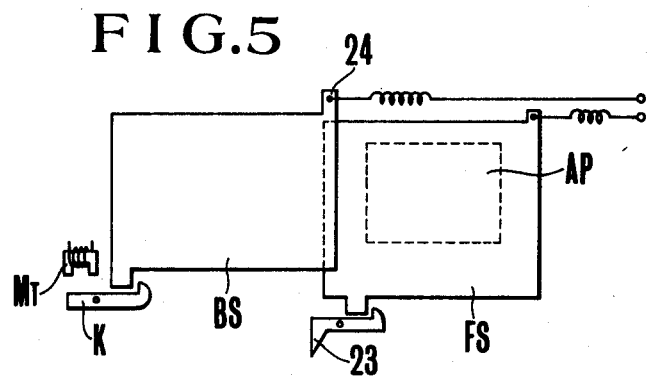
FIG. 5 is a schematic elevational view of a two-curtain type focal plane shutter adjacent which a signal input member of the release device of the invention is located.

FIG. 5 schematically shows the two curtain type focal plane shutter comprising a front shutter curtain FS movable between a latched position with the latch lever 23 of FIG. 1 disengaged from the actuating arm 13d to block an exposure aperture AP and a run down position where the exposure aperture AB is fully opened, and a rear shutter curtain BS movable between a latched position with a latch lever K cooperative with the electromagnet MT shown in FIG. 2 for unblocking the exposure aperature AP and a run down position where the aperture AP is blocked.

The operation of the camera of FIGS. 1 to 5 will next be described for better understanding of the function of the diaphragm scanning mechanism provided with the release device of the invention.

When an exposure is to be made in the shutter preselection automatic exposure range, the operator may turn the diaphragm ring 1 to place the symbol "AE" in registry with the index 39, and then turn the shutter speed dial SD of FIG. 3 to place a graduation representing a desired shutter speed in registry with the index. The variable resistor R16 of FIG. 2 is thereby adjusted to provide a resistance value corresponding to the preselected shutter speed. Now, assuming that the camera mechanism is set in the cocked position as shown in FIG. 1, and that the circuit of FIG. 2 is supplied with electrical power by having a not shown main switch closed.

Next when the shutter release button (not shown) is depressed to a first stroke, the switch S7 is opened causing the flip-flops FF1 and FF8 to produce signals of high level which are applied to the AND gate G so that a pulse train passes through the AND gate G to the binary counter H2. When the output of the binary counter H2 with the buffer amplifier A1 has coincided with the output of the exposure metering circuit as compared by the comparator CO1, the flip-flop FF8 is reset to produce a signal of low level which is applied to the AND gate G thereby the AND gate G is gated off. Thus, the exposure value representing in this instance an effective aperture value derived from the exposure metering circuit is stored in the binary counter H2.

Upon further depression of the shutter button to the second stroke, switch S1 is closed to draw a sudden current from the capacitor C1 through the solenoid of the magnet Mg1, thereby no magnetic flux is established in the core of magnet Mg1 to permit the armature 7 to be moved away from the magnet Mg1. As the semicircular lever 8 is turned clockwise under the action of spring 8a. the latch levers 9 and 32 are moved away from the diaphragm actuating lever 10 and the arresting lever 33 respectively. It is to be noted here that, at this time, the arresting lever 33 is held from movement because the solenoid of the arresting electromagnet Mg2 continues to be energized from the time the main switch is closed.

As the diaphragm actuating lever 10 is free from its latch lever 9, the spring powered driving lever 13 is acted on so that the mirror control lever 12 is turned counter-clockwise until its projection 13c abuts on a stopper pin 41, and at the same time that the scanning mechanism is released from its latch lever 15 and then the diaphragm closing down lever 11 begins to operate with the pin 40. The segment 16, after pivoting a very short distance abuts at an end of its slot on 16d on the pin 19 and then drives the scanning lever 18 for counter-clockwise movement, while rotating the reduction gear train 29 to 31. When the output of the scanning variable resistor R21 has coincided with the output of the binary counter H2 as compared by the comparator CO2, the output of the comparator CO2 is inverted to deenergize the solenoid of electromagnet Mg2. This causes counter-clockwise movement of the arresting lever 33 under the action of spring 33a until the arresting lever pawl engages with one of the teeth of the stop wheel 31b. During this scanning process, the diaphragm presetting ring 2 is maintained engaged with the motion transmitting member or swing lever 20 of the scanning mechanism. Thus, the scanning result is introduced into the lens aperture mechanism in which, as the diaphragm blades are simultaneously operated by the engagement between the pin 40 and lever 11 to adjust the acutal size of diaphragm aperture to the presetting by the diaphragm presetting ring 2, the scanning result is translated to the proper diaphgram aperture.

At a time the driving lever 13 arrives at a point near the terminal end of the full range of driving motion after the reflex mirror 36 has reached the non-viewing position and the lens aperture mechanism has been closed down to the presetting, the front shutter curtain FS is released from the latch lever 23 as striked by the arm 13d, running down to initiate an exposure. The switch S6 is simultaneously opened to initiate charging of the timing capacitor C. In a time interval dependent upon the time constant of the second timing circuit R19, C1, the switching circuit ALB is triggered to deenergize the shutter electromagnet MT, thereby the rear shutter curtain BS is released from the latch lever K, running down to terminate the exposure.

Responsive to the running down movement of the rear shutter curtain BS, the detecting member 24 strikes both the mirror return control lever pin 14b and the actuating lever pin 25 for the release device of the invention. As the actuating lever 25 is driven for clockwise movement with counter-clockwise movement of the release lever 26 engaged therewith, the latch lever 27 is operated to disengage from the drive charge lever 28, so that the driving lever arrangement 16, 18 is caused to collapse with the lever 28 abutting on the stopper pin 16c extending from the segment 16. Thereafter, the segment 16 is allowed to turn clockwise under the action of spring 16b until it abuts on the stopper pin 42 independently of the returning movement of the scanning member 18, 19 despite of the fact that the arresting lever pawl 33 remains in contact with the stop wheel 31b. As soon as the shutter is closed, therefore, the diaphgram scanning mechanism takes the initial position where the diaphgram ring 1 may be manipulated together with the pre-viewing lever 34, while the other portions of the camera mechanism being left in the un-cocked position.

As the mirror return control lever pin 14b slides off from the driving tab 13b of the driving lever 13, the mirror control lever 12 is turned clockwise, preceded by counter-clockwise movement of the lever 10 under the action of spring 10a. The mirror 36 thereby returns to the viewing position, and the diaphgram blades are opened by counter-clockwise movement of the lever 11 under the action of spring 11a.

Alternatively, when an exposure is to be made in the diaphgram preselection automatic exposure range, the photographer may turn the shutter dial SD to place "AA" in registry with the index, thereby the switch elements S2b and S3b are closed, and the switch S4 is set from "M" position to "A" position. Next, the diaphgram ring 1 is turned to place a graduation representing a desired aperture value in registry with the index 39, thereby the switch elements S2a and S3a are opened, and the cam lobe 1b is moved away from the cam follower pin 3, resulting in engagement between the latch lever pawl 6b and the acceptor pawl 17b. As the diaphgram presetting ring 2 follows the diaphgram ring 1 in engagement between the lugs 1a and 2b, the scanning member 18 is moved relative to the stationary driving segment 16 under the action of spring 20a so that the variable resistor R17 is adjusted to a resistance level dependent upon the setting of the diaphgram ring 1. Accordingly, in this instance, the output of the exposure metering circuit represents an effective exposure time.

When the shutter release button is depressed to close the switch S1, in a manner similar to that shown in connection with the shutter preselection exposure control, the mirror 36 is moved to the non-viewing position, and the diaphgram blades are closed down to the manually selected aperture value. In this case, although the latch lever pawl 15b is disengaged from the acceptor pawl 17a, the driving segment remains stationary in the initial position as the latch lever pawl 6b engages the acceptor pawl 17b. Further, although the latch lever 32 is disengaged from the arresting lever tail 33 and then brought into contact at its pawl with one of the teeth on the stopper wheel 31b under the action of spring 33a, because of no energization of the diaphgram magnet Mg2, the driving member or segment 16 is not acted on the scanning member 18 during the manual scanning process. When the front shutter curtain FS runs down to open the count start switch S6, the first timing circuit comprising the transistorized logarithmic extension circuit ET, having an input impedance corresponding to the output of the buffer amplifier A1 and the timing capacitor C1, is actuated to produce a trigger signal for the switching circuit ALB in a time interval corresponding to the computed exposure value. Upon advent of the trigger signal, the shutter electromagnet MT is deenergized to terminate the exposure.

In a manner similar to that shown in connection with the shutter preselection exposure control, the driving lever arrangement for the scanning mechanism collapse at the time of the running down movement of the rear shutter curtain.

After the exposure has been completed, the photographer may turn the film winding lever or shutter cocking lever so that the shaft 43 with the cam disk 43a is turned counter-clockwise. This causes clockwise movement of the upper and lower levers 45 and 46 through the cam disk 43a-and-follower pin 44 connection. This in turn causes counter-clockwise movement of the lever 47 against the force of spring 47a, thereby the armature 7-carrying semi-circular lever 8 and the arresting lever 33 are brought into the cocked position by engagement with the respective resilient arms 48a and 48b. The lever 8 is simultaneously released from the latch lever 32 to effect engagement between the latch lever pawl 32 and the arresting lever tail 33. Also the lever 8 is released from the latch lever pin 9c to effect engagement between the latch lever pawl 9b and the diaphgram actuating lever pin 10b, because of the fact that, at this time, the shutter is already reset with the detecting member 24 arriving at the initial position.

As the lever 46 is turned clockwise, the drive charge lever 28 is turned clockwise to increase the tension of the spring 16a until the charge lever pawl 28a engages with the latch lever lug 27b, thereby the release device of the invention is set in the active position. During this resetting process, the segment 16 is not acted on.

As the lever 45 is turned clockwise, the driving lever 13 is turned clockwise by having its downwardly extending arm 13e engaged with the lever 45. The mirror return control lever 14 is simultaneously brought into engagement with the driving tab 13b.

If the photographer desires to determine the utilizable zone of sharpness, the diaphgram ring 1 may be turned to scan the diaphgram scale provided thereon, on one hand. On the other hand, the pre-view lever 34 is turned clockwise to displace the slide 35 against the force of spring 35a through a length such that the diaphragm closing down lever 11 is turned clockwise by engagement with the pin 35b to a point at which the lever 11 is hindered from further movement, thereby the actual size of the diaphragm aperture is adjusted to the setting made on the diaphragm ring 1. According to the present invention, the diaphragm scanning mechanism is constructed so that when the shutter is closed, the interlocking connection between the scanning member and the arresting means therefor is immediately released to permit manipulation of the diaphgram ring 1 regardless of whether or not the camera is in the cocked position. In the case of the shutter preselection automatic exposure control, the near limit and far limit of the object field to be photographed can be measured before the diaphragm ring 1 is placed in registry at "AE" with the index without the necessity of cocking of the camera. In the case of the diaphragm preselection automatic exposure control, after the range of sharpness is read off in dependence of the adjusted setting of the diaphragm, either the cocking lever followed by shutter release button, or the shutter button alone, as the case may be, will be operated to initiate a subsequent exposure.

It will be seen from the foregoing that the present invention provides an electrically operating diaphragm scanning mechanism with electromagnetically operated arresting means in combination with a relase device therebetween, these parts being so arranged and constructed that the interlocking connection between the lens aperture mechanism and the diaphgram control mechanism is released in automatic response to the termination of an exposure. Therefore diaphragm ring may be manipulated while over-looking the resetting of the camera. Thus, full use of the efficiency of single lens reflex cameras of the type having the shutter preselection and diaphragm preselection automatic exposure ranges and employing the release device of the invention for the diaphragm scanning mechanism is achieved.

What is claimed is:

1. In a photographic camera having automatic diaphragm control, the combination comprises:
   (a) lens aperture means with a diaphragm ring accessible from the outside of said camera;
   (b) an automatic exposure value computer;
   (c) a diaphragm scanning mechanism having a scanning member and a driving member for said scanning member;
   (d) a diaphragm presetting member cooperative with either of said diaphragm ring and said scanning mechanism for presetting said lens aperture means;
   (e) electromagnetically operated arresting means for arresting said scanning mechanism at a time when the output of said scanning mechanism has reached a lever dependent upon the output of said exposure value computer;
   (f) a release device for releasing positive connection between said driving member and said scanning member;
   (g) shutter means;
   (h) actuating means responsive to the termination of actuation of said shutter means for actuating said release device;
   (i) automatic diaphragm closing down means cooperative with said lens aperture means; and
   (j) pre-viewing means operatively connectable with said automatic diaphragm closing down means upon connection to permit checking of the depth of field in dependence on the manually adjusted setting of the diaphragm aperture by said diaphragm presetting member; whereby after the camera shutter is closed, the interlocking connection between said lens aperture means and said diaphragm scanning mechanism is released by said actuating means, enabling manipulation of said diaphragm ring followed by said pre-viewing means to check the depth of object field to be photographed regardless of whether or not said camera is in the cocked position.

2. The combination according to claim 1, wherein said diaphragm scanning mechanism is provided with a second driving member arranged to exert force in the opposite direction to that in which said first-named driving member exerts force.

3. The combination according to claim 2, wherein said pre-viewing means includes means causing connection between said pre-viewing means and said automatic diaphragm closing down means so that upon actuation the size of diaphragm aperture in the lens aperture means is decreased to a value preselected on said diaphragm ring.

4. In a photographic camera having automatic diaphragm control, the combination comprises:
   (a) lens aperture means with a diaphragm ring accessible from the outside of said camera;
   (b) an automatic exposure value computer;
   (c) a diaphragm scanning mechanism having a scanning member and a driving member for said scanning member;
   (d) a first driving power source operatively connected to said driving member for causing said driving member to drive said scanning member for scanning operation;
   (e) a second driving power source operatively connected to said driving member for causing said driving member to move back to the initial position;
   (f) a diaphragm presetting member cooperative with either of said diaphragm ring and said scanning mechanism for presetting said lens aperture means;
   (g) electromagnetically operated arresting means for arresting said scanning mechanism, as the latter is driven by said first driving power source through said driving member, at a time when the output of said scanning mechanism has reached a lever dependent upon the output of said exposure value computer;
   (h) shutter means;
   (i) a release device for releasing operative connection between said driving member and said first driving power source in automatic response to the termination of actuation of said shutter means;
   (j) automatic diaphragm closing down means cooperative with said lens aperture means; and
   (k) pre-viewing means operatively connectable with said automatic diaphragm closing down means upon connection to permit checking of the depth of field in dependence on the manually adjusted setting of the diaphragm aperture on said diaphragm ring by said diaphragm presetting member; whereby after the camera shutter is closed, said driving member is returned to the initial position by said second driving power source, enabling manipulation of said diaphragm ring followed by said pre-viewing means to check the depth of object field to be photographed regardless of whether or not said camera is in the cocked position.

5. The combination according to claim 4, further including latching means arranged upon response of the termination of actuation of said shutter means to latch said driving member in the initial position.

6. A photographic camera according to claim 5, further including shutter cocking means and means responsive to the operation of said shutter cocking means for establishing effective connection between said driving member and said first driving power source.

7. In a photographic camera having automatic diaphragm control, the combination comprises:
   (a) lens aperture means with a diaphragm ring accessible from the outside of said camera;

(b) an automatic exposure value computer;

(c) a diaphragm scanning mechanism having a scanning member and a driving member for said scanning member;

(d) a first driving power source operatively connected to said driving member for causing said driving member to drive said scanning member for scanning operation;

(e) a second driving power source operatively connected to said driving member for causing said driving member to move back to the initial position;

(f) a diaphragm presetting member cooperative with either of said diaphragm ring and said scanning mechanism for presetting said lens aperture means;

(g) electromagnetically operated arresting means for arresting said scanning mechanism, as the latter is driven by said first driving power source through said driving member, at a time when the output of said scanning mechanism has reached a level dependent upon the output of said exposure value computer;

(h) shutter means;

(i) a release device for releasing operative connection between said driving member and said first driving power source in automatic response to the termination of actuation of said shutter means;

(j) latching means cooperative with said shutter means upon response to the termination of actuation of said shutter means for latching said driving member in the initial position;

(k) shutter cocking means;

(l) means for establishing effective connection between said first driving power source and said driving member in automatic response to the operation of said shutter cocking means;

(m) automatic diaphragm closing down means cooperative with said lens aperture means;

(n) pre-viewing means operatively connectable with said automatic diaphragm closing down means upon connection to permit checking the depth of field in dependence on the manually adjusted setting of the diaphragm aperture on said diaphragm ring; whereby after the camera shutter is closed, said driving member is returned to the initial position by said second driving power source, enabling manipulation of said diaphragm ring followed by said pre-viewing means to check the depth of object field to be photographed regardless of whether or not said camera is in the cocked position.

8. The combination according to claim 4, wherein said electromagnetically operated arresting means is constructed so that said driving member is allowed to move under the action of said second driving power source, while being maintained engaged with said arresting means.

9. A camera having a diaphragm control device, including:

(a) a diaphragm presetting member for determining a diaphragm aperture value;

(b) a preset driving mechanism connected to said diaphragm presetting member for driving said diaphragm presetting member to cause performance of presetting operation by the diaphragm presetting member, said preset driving mechanism including a source of driving force operatively connected to said mechanism to provide driving force to said mechanism, whereby said driving mechanism is driven by the source of driving force causing performance of presetting operation by the diaphragm presetting member;

(c) an electromagnetic mechanism operatively connected to said driving mechanism for stopping said mechanism from being driven by the source of driving force;

(d) a release mechanism for releasing operative connection of said source of driving force with the preset driving mechanism;

(e) shutter means;

(f) release mechanism actuating means operatively coupled with said shutter means and responsive to shutter closing operation by the shutter means for actuating said release mechanism; and (g) pre-view means operatively connected to said diaphragm presetting member to close down the diaphragm to the diaphragm value set by said diaphragm presetting member in order to pre-view the depth of field of the set diaphragm value; whereby, after completion of the exposure, the connection of the preset driving mechanism with the source of driving force is released, and the control of the diaphragm presetting member by the preset driving mechanism is released to permit the presetting operation of the diaphragm by the diaphragm presetting member independently of the preset driving mechanism and to permit the pre-viewing operation for the depth of field by the pre-view means.

10. The camera according to claim 9 further comprising a second source of driving force connected to said preset driving mechanism for exerting a force in the opposite direction to that in which said first-named source of driving force exerts a force.

11. The camera according to claim 10 wherein said pre-view means includes means causing connection between said pre-view means and said diaphragm presetting member.

12. A camera having a diaphragm control device, including:

(a) a diaphragm presetting member for determining a diaphragm aperture value;

(b) a driving member connected to said diaphragm presetting member for driving said diaphragm presetting member to cause performance of presetting operation by the diaphragm presetting member;

(c) a first source of driving force operatively connected to said driving member providing a driving force to said driving member so that said driving member is driven to effect presetting operation by said diaphragm presetting member;

(d) a second source of driving force operatively connected to said driving member and having a driving force for returning the driving member to the initial position;

(e) an electromagnetic mechanism operatively connected to said driving member for stopping said member from being driven by the first source of driving force;

(f) shutter means;

(g) a release mechanism for releasing operative connection of said first source of driving force with the driving member, said release mechanism being constructed to be operatively coupled with said shutter means and to be actuated by shutter closing operation by the shutter means; and (h) pre-view means operatively connected to said diaphragm presetting member to close down the diaphragm to the diaphragm value set by said diaphragm presetting member in order to pre-view the depth of field of the set diaphragm value; whereby, after completion of the exposure, the driving member is returned to the initial state by the second source of driving force, and locking of the diaphragm presetting member is released so that the preset of the diaphragm by the diaphragm presetting member becomes possible and the pre-view of the diaphragm by the pre-view means becomes possible.

13. The camera according to claim 12 further including latching means arranged to latch said driving member in the initial position upon shutter closing operation of said shutter means.

14. The camera according to claim 13 further including shutter cocking means and means responsive to the operation of said shutter cocking means for establishing effective connection between said driving member and said first source of driving force.

15. A camera including a diaphragm control device, comprising:
   (a) a light measuring circuit for measuring object brightness to produce an electrical signal corresponding to the brightness;
   (b) a diaphragm presetting member for determining a diaphragm aperture value;
   (c) a preset driving mechanism connected to said diaphragm presetting member for driving said diaphragm presetting member to cause performance of presetting operation by the diaphragm presetting member, said preset driving mechanism including a source of driving force operatively connected to said mechanism to provide driving force to said mechanism, whereby said driving mechanism is driven by the source of driving force causing performance of presetting operation by the diaphragm presetting member;
   (d) converting means for converting the amount of driving of the diaphragm presetting member by said driving mechanism into an electrical signal;
   (e) a comparing circuit for comparing the electrical signal of said light measuring circuit with the electrical signal of said converting means to produce an output when a predetermined relationship between said electrical signals is reached;
   (f) an electromagnetic mechanism operatively connected to said driving mechanism so as to stop the driving of said driving mechanism by said source of driving force in response to the output of said comparing circuit;
   (g) a release mechanism for releasing operative connection of said source of driving force with the preset driving mechanism;
   (h) a restoring means connected to said preset driving mechanism to restore said preset driving mechanism to its initial position, said restoring means being actuated when the connection between the source of driving force and the preset driving mechanism is released by the release mechanism to restore the preset driving mechanism to its initial position;
   (i) shutter means;
   (j) a release mechanism actuating means operatively coupled with said shutter means and responsive to shutter closing operation by the shutter means for actuating said release mechanism; and
   (k) pre-view means operatively connected to said diaphragm presetting member to close down the diaphragm to the diaphragm value set by said diaphragm presetting member in order to pre-view the depth of field of the set diaphragm value.

16. A camera having a diaphragm control device, including:
   (a) a diaphragm presetting member for determining a diaphragm aperture value;
   (b) a driving member coupled to said diaphragm presetting member for driving said diaphragm presetting member to cause performance of presetting operation by the diaphragm presetting member;
   (c) a first source of driving force operatively connected to said driving member providing a driving force to the driving member so that the driving member is driven to cause performance of presetting operation by said diaphragm presetting member;
   (d) a second source of driving force operatively connected to said driving member and having a driving force for returning the driving member to the initial position;
   (e) an electromagnetic mechanism operatively connected to said driving member for stopping said member from being driven by the first source of driving force;
   (f) shutter means;
   (g) a release mechanism for releasing operative connection of said first source of driving force with the driving member, said release mechanism being constructed to be operatively coupled with said shutter means and to be actuated by shutter closing operation of the shutter means;
   (h) locking means movable in connection with said shutter means and responsive to the shutter closing operation of the shutter means for locking said driving member in the initial position;
   (i) a winding-up mechanism for performing winding-up operation of the shutter;
   (j) a connecting member movable in connection with said winding-up mechanism and responsive to the winding-up operation for operatively connecting said first source of driving force with the driving member; and
   (k) pre-view means operatively connected to said diaphragm presetting member to close down the diaphragm to the diaphragm value set by said diaphragm presetting member in order to pre-view the depth of field of the set diaphragm value.

17. The camera according to claim 16 wherein said electromagnetic mechanism is arranged to permit said driving member to move under the influence of said second source of driving force, while being engaged by said mechanism.

* * * * *